(12) United States Patent
Heibel et al.

(10) Patent No.: US 10,755,829 B2
(45) Date of Patent: Aug. 25, 2020

(54) IRRADIATION TARGET HANDLING DEVICE FOR MOVING A TARGET INTO A NUCLEAR REACTOR

(71) Applicant: Westinghouse Electric Company LLC, Cranberry Township, PA (US)

(72) Inventors: Michael D. Heibel, Harrison City, PA (US); Matthew D. McArdle, Murrysville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1031 days.

(21) Appl. No.: 15/210,231

(22) Filed: Jul. 14, 2016

(65) Prior Publication Data

US 2018/0019031 A1    Jan. 18, 2018

(51) Int. Cl.
| G21G 1/02 | (2006.01) |
| G21C 17/108 | (2006.01) |
| G21C 19/22 | (2006.01) |

(52) U.S. Cl.
CPC ............. *G21G 1/02* (2013.01); *G21C 17/108* (2013.01); *G21C 19/22* (2013.01)

(58) Field of Classification Search
CPC ........ G21G 1/02; G21C 17/108; G21C 19/22; F16G 11/02; F16G 11/10
USPC ................................................. 376/202, 254
See application file for complete search history.

(56) References Cited

U.S. PATENT DOCUMENTS

| 3,378,891 A | * | 4/1968 | Metz ...................... F16G 11/10 |
| | | | 403/371 |
| 3,493,917 A | * | 2/1970 | Glowacz ................ H01R 13/20 |
| | | | 439/268 |
| 3,932,211 A | | 1/1976 | Loving, Jr. |
| 4,752,127 A | * | 6/1988 | Zafred ................. G21C 17/017 |
| | | | 376/248 |

(Continued)

FOREIGN PATENT DOCUMENTS

| EP | 0496998 A1 | 8/1992 |
| EP | 2 093 773 A2 | 8/2009 |
| JP | 2012013546 A | 1/2012 |

OTHER PUBLICATIONS

PCT/US2017/040645, International Search Report and Written Opinion, dated May 9, 2018, 14 Pages.

*Primary Examiner* — Jack W Keith
*Assistant Examiner* — Daniel Wasil
(74) *Attorney, Agent, or Firm* — K&L Gates LLP

(57) ABSTRACT

A device that will enable material to be irradiated as needed to produce a desired transmutation product inside the core of a nuclear reactor. The device provides a means for monitoring neutron flux in the vicinity of the material being irradiated to allow determination of the amount of transmutation product being produced. The device enables the irradiated material to be inserted into the reactor and held in place at desired axial positions and to be withdrawn from the reactor when desired without shutting down the reactor. The majority of the device may be re-used for subsequent irradiations. The device also enables the simple and rapid attachment of unirradiated target material to the portion of the device that transmits the motive force to insert and withdraw the target material into and out of the reactor and the rapid detachment of the irradiated material from the device for processing.

9 Claims, 2 Drawing Sheets

(56) References Cited

U.S. PATENT DOCUMENTS

| | | | |
|---|---|---|---|
| 7,384,209 B2* | 6/2008 | Muders | F16C 11/0614 |
| | | | 403/157 |
| 7,526,058 B2 | 4/2009 | Fawcett et al. | |
| 8,953,731 B2 | 2/2015 | Fawcett et al. | |
| 9,183,959 B2 | 11/2015 | Bloomquist et al. | |
| 9,208,909 B2 | 12/2015 | Runkle et al. | |
| 9,224,507 B2 | 12/2015 | Heinold et al. | |
| 9,239,385 B2 | 1/2016 | Fawcett et al. | |
| 9,305,673 B2 | 4/2016 | Heinold et al. | |
| 9,330,798 B2 | 5/2016 | Dayal et al. | |
| 2008/0240330 A1* | 10/2008 | Holden | G21G 1/12 |
| | | | 376/190 |
| 2013/0077725 A1 | 3/2013 | Bloomquist et al. | |
| 2013/0315361 A1 | 11/2013 | Berger et al. | |
| 2013/0336436 A1 | 12/2013 | Allen et al. | |
| 2014/0192944 A1 | 7/2014 | Ohsaka | |
| 2016/0012928 A1 | 1/2016 | Guler et al. | |
| 2017/0337997 A1* | 11/2017 | Woloshun | G21G 1/10 |
| 2018/0025803 A1* | 1/2018 | Richter | G21G 1/02 |
| | | | 376/202 |

\* cited by examiner

IRRADIATION TARGET HANDLING DEVICE FOR MOVING A TARGET INTO A NUCLEAR REACTOR

BACKGROUND

1. Field

This invention pertains generally to devices for insertion and withdrawal of articles into and out of a nuclear core and, more particularly, to a reusable device that provides a controlled insertion and withdrawal.

2. Related Art

A number of operating nuclear reactors employ a moveable in-core detector system such as the one described in U.S. Pat. No. 3,932,211. The moveable detector system generally comprises four, five or six detector/drive assemblies, depending upon the size of the plant (two, three or four loops), which are interconnected in such a fashion that they can assess various combinations of in-core flux thimbles. To obtain the thimble interconnection capability, each detector has associated with it a five path and ten path rotary mechanical transfer device. A core map is made by selecting, by way of the transfer devices, particular thimbles through which the detectors are driven. To minimize mapping time, each detector is capable of being run at high speed (72 feet per minute) from its withdrawn position to a point just below the core. At this point, the detector speed is reduced to 12 feet per minute and the detector traversed to the top of the core, direction reversed, and the detector traversed to the bottom of the core. The detector speed is then increased to 72 feet per minute and the detector is moved to its withdrawn position. A new flux thimble is selected for mapping by rotating the transfer devices and the above procedure repeated.

FIG. 1 shows the basic system for the insertion of the movable miniature detectors. Retractable thimbles 10, into which the miniature detectors 12 are driven, take the routes approximately as shown. The thimbles are inserted into the reactor core 14 through conduits extending from the bottom of the reactor vessel 16 through the concrete shield area 18 and then up to a thimble seal table 20. Since the movable detector thimbles are closed at the leading (reactor) end, they are dry inside. The thimbles thus serve as a pressure barrier between the reactor water pressure (2500 psig design) and the atmosphere. Mechanical seals between the retractable thimbles and the conduits are provided at the seal table 20. The conduits 22 are essentially extensions of the reactor vessel 16, with the thimbles allowing the insertion of the in-core instrumentation movable miniature detectors. During operation, the thimbles 10 are stationary and will be retracted only under depressurized conditions during refueling or maintenance operations. Withdrawal of a thimble to the bottom of the reactor vessel is also possible if work is required on the vessel internals.

The drive system for insertion of the miniature detectors includes basically drive units 24, limit switch assemblies 26, five path rotary transfer devices 28, 10 path rotary transfer devices 30, and isolation valves 32, as shown.

Each drive unit pushes a hollow helical-wrap drive cable into the core with a miniature detector attached to the leading end of the cable and a small diameter coaxial cable, which communicates the detector output, threaded through the hollow center back to the trailing end of the drive cable.

The use of the Movable Incore Detector System flux thimbles 10 for the production of irradiation desired neutron activation and transmutation products, such as isotopes used in medical procedures, requires a means to insert and withdraw the material to be irradiated from inside the flux thimbles located in the reactor core 14. Preferably, the means used minimizes the potential for radiation exposure to personnel during the production process and also minimizes the amount of radioactive waste generated during this process. In order to precisely monitor the neutron exposure received by the target material to ensure the amount of activation or transmutation product being produced is adequate, it is necessary for the device to allow an indication of neutron flux in the vicinity of the target material to be continuously measured. Ideally the means used would be compatible with systems currently used to insert and withdraw sensors within the core of commercial nuclear reactors. This invention describes an Isotope Production Cable Assembly that satisfies all the important considerations described above.

SUMMARY

This invention provides an irradiation target handling device having an Isotope Production Cable Assembly comprising a drive cable constructed to be compatible with the drive mechanism requirements for an existing nuclear reactor drive mechanism for cable drive systems used to insert and withdraw sensors within nuclear reactor cores. The drive cable has a spirally wound, self-powered radiation detector wrapped around an axial length of the drive cable proximate one end designed to be inserted into a flux thimble in a core of a nuclear reactor. The length of the self-powered radiation detector is sufficient to provide a preselected signal output with a minimal axial length from end to end of the spiral, so the self-powered radiation detector provides an output indicative of reactor flux at the self-powered radiation detector position in a reactor core to enable an axial position of a target material supported by and proximate the one end of the drive cable to be optimized.

A one of a female or male end of a quick disconnect coupling is attached to the one end of the drive cable; and a target holder element cable assembly has another of the female end or male end of the quick disconnect coupling attached at one end of the target holder element cable assembly and is configured to attach to and detach from the one of the female or male end. The target holder element cable assembly further has a target material support compartment configured to securely hold the target material as the drive cable is inserted and withdrawn through the flux thimble.

In one embodiment the target holder element cable assembly comprises a hollow cylinder of metal mesh having a length sufficient to hold the target material within the confines of the flux thimble. Preferably, the target holder element assembly is constructed from a material having substantially no cobalt and the wire mesh is as thin as required to support the target material in traveling through the flux thimble. Desirably, the hollow mesh cylinder is capped at one end by the quick disconnect coupling and at another end by a cap. In one such embodiment the cap is secured in place with a ring clamp and one such disconnect coupling may be a ball clasp coupling, also known as a ball chain coupling.

In one such embodiment the drive mechanism is part of an existing in-core moveable detector system wherein a signal output lead of the self-powered radiation detector is routed axially through an opening in the drive cable.

The invention also encompasses a method of irradiating a target material to produce a desired transmutation product. The method comprises a step of securing the target material to a target material holder element that is sized to travel within a flux thimble of a nuclear reactor core. The method fastens the target material holder element to one end of a drive cable that is to be inserted within the flux thimble, with a quick disconnect coupling, and with the drive cable having a self-powered radiation detector located on the drive cable proximate the one end with a self-powered radiation detector output routed along an axial length of the drive cable to a monitoring location outside the flux thimble. The method then drives the drive cable and the target material holder element to a preselected axial location within the flux thimble. The self-powered radiation detector output is then monitored at the monitoring location outside of the nuclear reactor core to determine the transmutation state of the target material. The target material holder element is withdrawn from the flux thimble when the target material has achieved the desired transmutation product. The target material holder element is then detached from the drive cable and shipped to a processing facility. At the processing facility the target material is removed from the target material holder element and processed.

Preferably, the method includes the step of reusing the drive cable with a new target material holder element. In one such embodiment the disconnect coupling is a ball and clasp coupling. In another embodiment the target material holder is a mesh cylinder that is capped at one end by the quick disconnect coupling and at a second, distal end by a cover, including the step of securing the cover with a ring clamp. In the latter embodiment the step of removing the ring clamp is performed at the processing facility to remove the cover to access the target material for processing.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
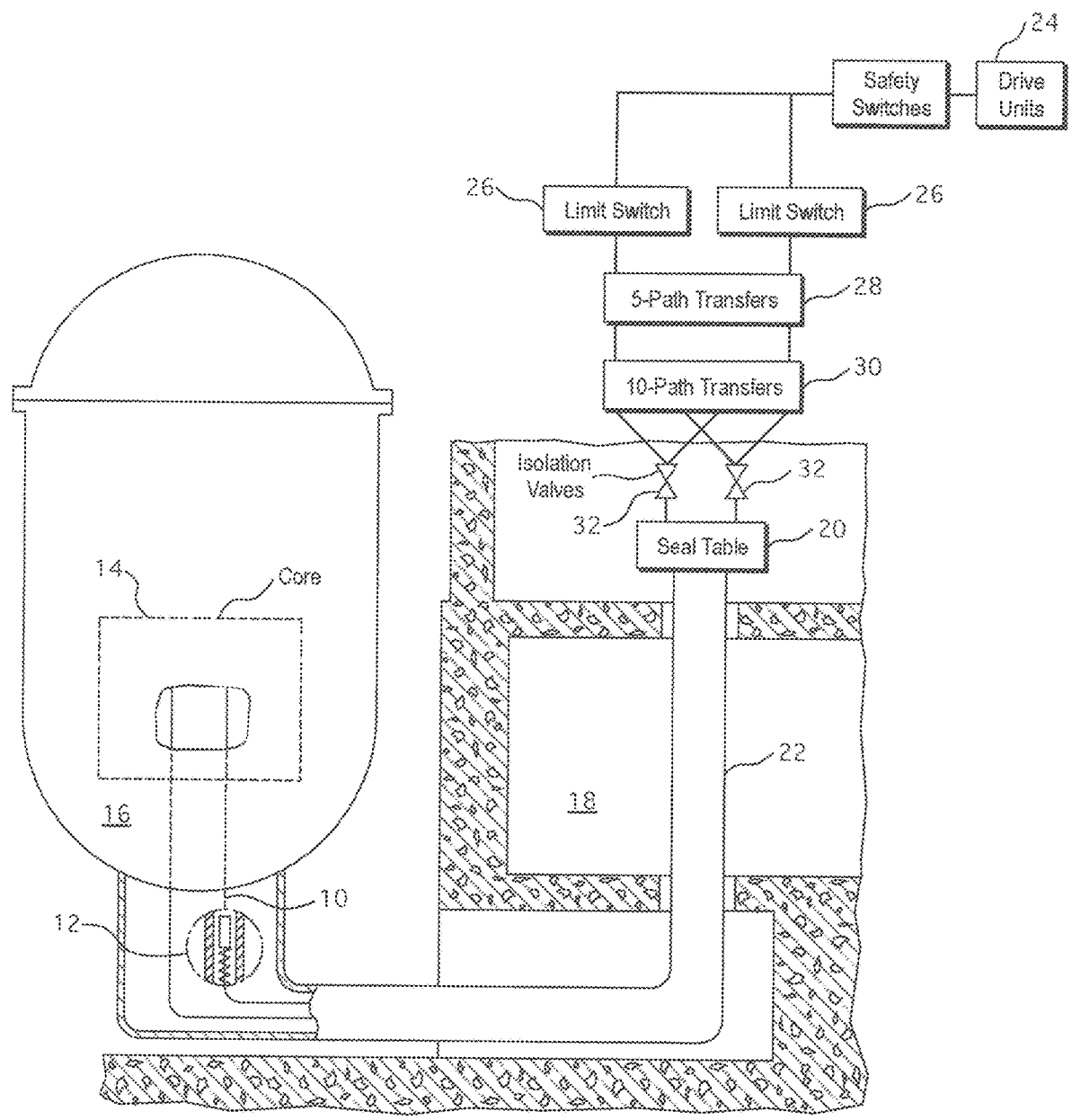
FIG. 1 is a perspective view of a prior art in-core moveable detector arrangement that can be employed with this invention.

The Isotope Production Cable Assembly shown in FIGS. 2-5 is composed of two main elements, i.e., a Driver Cable Assembly 36 and a Target Holder Element 38. The major component is the Drive Cable Assembly 36. The Drive Cable Assembly 36 comprises a cable constructed to be compatible with the drive mechanism requirements for the existing cable drive systems used to insert and withdraw sensors 12 within commercial nuclear reactor cores 14, such as the Westinghouse Movable In-core Detector System that is schematically shown in FIG. 1. The Drive Cable Assembly 36 interior contains the signal lead 42 for a self-powered detector element 44. The active portion of the self-powered detector 44 is a spiral wound around the exterior of the inserted end of the drive cable 40 with a length sufficient to provide a robust signal output and a minimum of axial position difference from end to end. The output from the self-powered detector 44 is used to identify the reactor flux at the self-powered detector position in the reactor core 14 to allow the axial position of the target material to be optimized.

Figure 2:
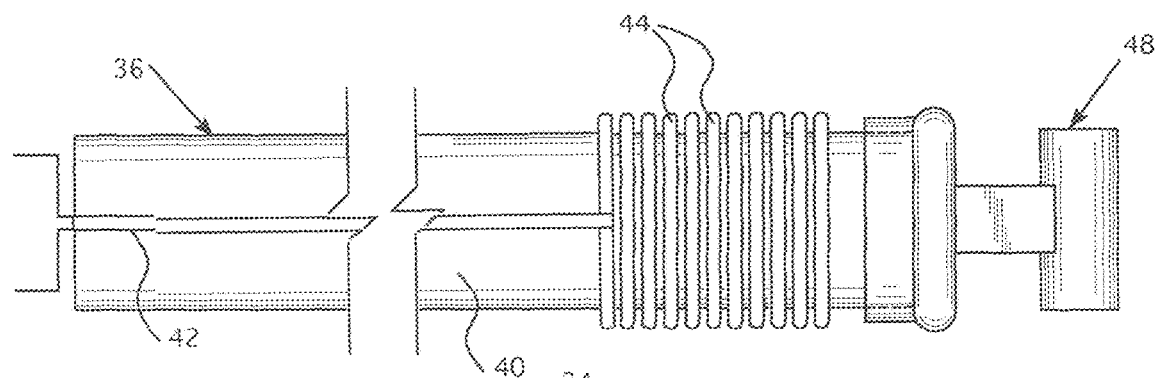
FIG. 2 is a schematic representation of one embodiment of an Isotope Production Cable Assembly Drive Cable Assembly of this invention.
Figure 3:
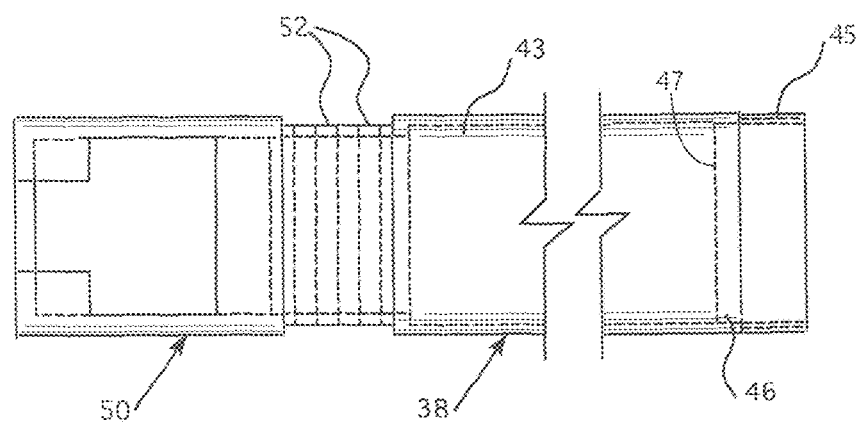
FIG. 3 is a plan view of the Target Holder Element and the female portion of the quick disconnect that connects the Target Holder Element Cable Assembly to the Drive Cable Assembly shown in FIG. 2.
Figure 4:
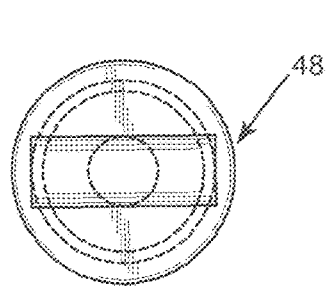
FIG. 4 is a frontal view of the male portion of the quick disconnect shown on the core insertion side of the Drive Cable Assembly shown in FIG. 2.
Figure 5:
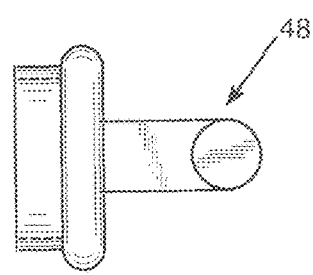
FIG. 5 is a side view of the male portion of the quick disconnect shown in FIGS. 2 and 4.

The Drive Cable Assembly 36, which is a replacement for an existing drive cable to which one of the miniature detectors 12 was coupled to, attaches to a Target Holder Element Cable Assembly 38 using the ball clasp arrangement (also known as a ball chain coupling) identified in FIGS. 2-5 by reference characters 48 and 50. The ball and clasp arrangement has a ball or male portion 48, shown in FIGS. 2, 4 and 5, connected to the reactor insertion end of the Drive Cable Assembly 36. FIG. 2 shows a plan view of the ball portion 48, FIG. 4 shows a frontal view and FIG. 5 shows a side view. The clasp portion 50 is attached to a target material holder 43 on the Target Holder Element Cable Assembly 38 with connector pins 52. The ball portion 48 of the quick disconnect coupling is designed fit within and be detachably captured by the clasp portion 50. The Target Holder Element Cable Assembly 38 comprises the target material holder 43, which is a hollow cylinder of a very thin metal mesh 47 that has a length sufficient to hold the desired amount of target material within the confines of the active reactor core 14. After the target material is withdrawn from the reactor, the Target Holder Element Cable Assembly 38 may be easily and quickly disconnected from the Drive Cable Assembly 36 so the entire Target Holder Element Cable Assembly may be shipped to a processing facility. The Cap 45 indicated on the inserted end of the Target Holder Element Cable Assembly 38 is held in place by a ring clamp 46. The ring clamp 46 is designed to be simple to remove at the processing facility. Once it is removed the irradiated material may be removed from the inside of the Target Holder Element Cable Assembly. Only the Target Holder Element Cable Assembly 38 is disposed of following irradiation. The Drive Cable Assembly 36 is reused as long as mechanically practical.

Accordingly, this invention enables the production of valuable activation and transmutation products using existing commercial reactor cable drive systems for in-core instrumentation. While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An irradiation target handling device having an isotope production cable assembly comprising:

a drive cable configured for use with an existing nuclear reactor drive mechanism for cable drive systems configured to insert and withdraw sensors within nuclear reactor cores, wherein an interior of the drive cable comprises a signal lead; a self-powered radiation detector, wherein the self-powered radiation detector is spirally wound and wrapped around an axial length of the drive cable, wherein the self-powered radiation detector is located on the drive cable proximate one end of the drive cable that is designed to be inserted into a flux thimble in a core of a nuclear reactor, wherein the self-powered radiation detector comprises a length configured to provide a preselected signal output with a minimal axial length from end to end of the spiral such that the self-powered radiation detector provides an output indicative of reactor flux at a position of the self-powered radiation detector position in a reactor core to optimize an axial position of a target material supported by and proximate the one end of the drive cable;

a one of a female end or male end of a quick disconnect coupling attached to the one end of the drive cable; and a target holder element cable assembly having another of the female end or male end of the quick disconnect coupling at one end of the target holder element cable assembly, configured to attach to and detach from the one of the female or male end attached to the one end of the drive cable, the target holder element cable assembly having a target material holder configured to hold the target material as the drive cable is inserted and withdrawn through the flux thimble.

2. The irradiation target handling device of claim 1 wherein the target holder element cable assembly comprises a hollow cylinder of metal mesh having a length configured to hold the target material within the confines of the flux thimble.

3. The irradiation target handling device of claim 2 wherein the target holder element assembly is constructed from a material having substantially no cobalt.

4. The irradiation target handling device of claim 2 wherein the metal mesh is configured to support the target material in traveling through the flux thimble.

5. The irradiation target handling device of claim 2 wherein the hollow cylinder comprises the quick disconnect coupling at one end and a cap at another end.

6. The irradiation target handling device of claim 5 wherein the cap is secured in place with a ring clamp.

7. The irradiation target handling device of claim 1 wherein the quick disconnect coupling is a ball clasp coupling.

8. The irradiation target handling device of claim 1 wherein the drive cable is constructed for use with a drive mechanism that is part of an existing in-core moveable detector system.

9. The irradiation target handling device of claim 1 wherein the self-powered radiation detector further comprises a signal output lead routed axially through an opening in the drive cable.

* * * * *